United States Patent
Zhao et al.

(10) Patent No.: US 9,726,300 B2
(45) Date of Patent: Aug. 8, 2017

(54) SELF-LUBRICATING FLEXIBLE CARBON COMPOSITE SEAL

(71) Applicants: Lei Zhao, Houston, TX (US); Zhiyue Xu, Cypress, TX (US)

(72) Inventors: Lei Zhao, Houston, TX (US); Zhiyue Xu, Cypress, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/553,441

(22) Filed: Nov. 25, 2014

(65) Prior Publication Data
US 2016/0145966 A1 May 26, 2016

(51) Int. Cl.
F16K 41/04 (2006.01)
F16J 15/02 (2006.01)

(52) U.S. Cl.
CPC .......... *F16K 41/04* (2013.01); *F16J 15/022* (2013.01)

(58) Field of Classification Search
CPC .... E21B 2033/005; E21B 4/003; E21B 10/25; E21B 33/00; F16J 15/3212; F16J 15/328; F16J 15/32
USPC ................................ 277/554, 627, 626, 336
See application file for complete search history.

(56) References Cited

U.S. PATENT DOCUMENTS

| 2,462,067 | A | | 2/1949 | Buckendale |
| 3,904,405 | A | | 9/1975 | Russell et al. |
| 3,981,427 | A | | 9/1976 | Brookes |
| 4,116,451 | A | * | 9/1978 | Nixon ............. F16J 15/30 277/336 |
| 4,205,858 | A | | 6/1980 | Shimazaki et al. |
| 4,234,638 | A | | 11/1980 | Yamazoe et al. |
| 4,798,771 | A | | 1/1989 | Vogel |
| 4,799,956 | A | | 1/1989 | Vogel |
| 4,826,181 | A | * | 5/1989 | Howard ............. F16J 15/20 277/539 |
| 4,885,218 | A | | 12/1989 | Andou et al. |
| 5,117,913 | A | | 6/1992 | Thernig |
| 5,134,030 | A | | 7/1992 | Ueda et al. |
| 5,201,532 | A | | 4/1993 | Salesky et al. |
| 5,225,379 | A | | 7/1993 | Howard |
| 5,228,701 | A | | 7/1993 | Greinke et al. |
| 5,247,005 | A | | 9/1993 | Von Bonin et al. |
| 5,257,603 | A | | 11/1993 | Bauer et al. |
| 5,283,121 | A | | 2/1994 | Bordner |

(Continued)

FOREIGN PATENT DOCUMENTS

CA 2429780 A1 12/2003
EP 0747615 B1 10/2001

(Continued)

OTHER PUBLICATIONS

Baxter et al., "Microstructure and solid particle erosion of carbon-based materials used for the protection of highly porous carbon-carbon composite thermal insulation", Journal of Materials Science, vol. 32, 1997, pp. 4485-4492.

(Continued)

*Primary Examiner* — Kristina Fulton
*Assistant Examiner* — Eugene G Byrd
(74) *Attorney, Agent, or Firm* — Cantor Colburn LLP

(57) ABSTRACT

A self-lubricating flexible carbon composite seal includes an annular body formed from a flexible carbon composite.

19 Claims, 14 Drawing Sheets

(56) References Cited

U.S. PATENT DOCUMENTS

| | | | |
|---|---|---|---|
| 5,286,574 A * | 2/1994 | Foster | C09K 3/1028 277/591 |
| 5,392,982 A | 2/1995 | Li | |
| 5,455,000 A | 10/1995 | Seyferth et al. | |
| 5,467,814 A | 11/1995 | Hyman et al. | |
| 5,494,753 A | 2/1996 | Anthony | |
| 5,495,979 A | 3/1996 | Sastri et al. | |
| 5,730,444 A * | 3/1998 | Notter | B29C 45/14065 277/554 |
| 5,941,313 A | 8/1999 | Arizmendi | |
| 5,992,857 A | 11/1999 | Ueda et al. | |
| 6,020,276 A | 2/2000 | Hoyes et al. | |
| 6,027,809 A | 2/2000 | Ueda et al. | |
| 6,075,701 A | 6/2000 | Ali et al. | |
| 6,105,596 A | 8/2000 | Hoyes et al. | |
| 6,128,874 A | 10/2000 | Olson et al. | |
| 6,131,651 A | 10/2000 | Richy, III | |
| 6,152,453 A | 11/2000 | Kashima et al. | |
| 6,161,838 A | 12/2000 | Balsells | |
| 6,234,490 B1 | 5/2001 | Champlin | |
| 6,506,482 B1 | 1/2003 | Burton et al. | |
| 6,581,682 B1 | 6/2003 | Parent et al. | |
| 6,789,634 B1 | 9/2004 | Denton | |
| 6,880,639 B2 | 4/2005 | Rhodes et al. | |
| 7,105,115 B2 | 9/2006 | Shin | |
| 7,470,468 B2 | 12/2008 | Mercuri et al. | |
| 7,666,469 B2 | 2/2010 | Weintritt et al. | |
| 2001/0003389 A1 * | 6/2001 | Pippert | F16J 15/22 277/627 |
| 2002/0114952 A1 | 8/2002 | Ottinger et al. | |
| 2004/0026085 A1 | 2/2004 | Vacik et al. | |
| 2004/0097360 A1 | 5/2004 | Benitsch et al. | |
| 2004/0121152 A1 | 6/2004 | Toas | |
| 2004/0127621 A1 | 7/2004 | Drzal et al. | |
| 2004/0178626 A1 | 9/2004 | Segreto | |
| 2004/0186201 A1 | 9/2004 | Stoffer et al. | |
| 2006/0124304 A1 | 6/2006 | Bloess et al. | |
| 2006/0272806 A1 | 12/2006 | Wilkie et al. | |
| 2007/0054121 A1 | 3/2007 | Weintritt et al. | |
| 2007/0142547 A1 | 6/2007 | Vaidya et al. | |
| 2008/0128067 A1 | 6/2008 | Sayir et al. | |
| 2008/0240879 A1 | 10/2008 | Dourfaye et al. | |
| 2009/0130515 A1 | 5/2009 | Son et al. | |
| 2009/0302552 A1 * | 12/2009 | Leinfelder | F16J 15/122 277/608 |
| 2010/0098956 A1 | 4/2010 | Sepeur et al. | |
| 2010/0122821 A1 | 5/2010 | Corre et al. | |
| 2010/0163252 A1 | 7/2010 | De La Mothe et al. | |
| 2010/0203340 A1 | 8/2010 | Ruoff et al. | |
| 2010/0289198 A1 | 11/2010 | Balsells et al. | |
| 2011/0045724 A1 | 2/2011 | Bahukudumbi | |
| 2011/0098202 A1 | 4/2011 | James et al. | |
| 2011/0278506 A1 | 11/2011 | Toyokawa | |
| 2013/0001475 A1 | 1/2013 | Christ et al. | |
| 2013/0045423 A1 | 2/2013 | Lim et al. | |
| 2013/0096001 A1 | 4/2013 | Choi et al. | |
| 2013/0192853 A1 | 8/2013 | Themig | |
| 2013/0284737 A1 | 10/2013 | Ju et al. | |
| 2013/0287326 A1 | 10/2013 | Porter et al. | |
| 2014/0051612 A1 | 2/2014 | Mazyar et al. | |
| 2014/0127526 A1 | 5/2014 | Etschmaier et al. | |
| 2014/0272592 A1 | 9/2014 | Thompkins et al. | |
| 2016/0145966 A1 | 5/2016 | Zhao et al. | |
| 2016/0333657 A1 | 11/2016 | Zhao et al. | |

FOREIGN PATENT DOCUMENTS

| | | |
|---|---|---|
| EP | 2056004 A1 | 5/2009 |
| EP | 2586963 A1 | 5/2013 |
| JP | 2014141746 | 8/2014 |
| WO | 9403743 | 2/1994 |
| WO | 03102360 | 12/2003 |
| WO | 2005115944 | 12/2005 |
| WO | 2007138409 A1 | 12/2007 |
| WO | 2008021033 A2 | 2/2008 |
| WO | 2014028149 A1 | 2/2014 |
| WO | 2016085594 A1 | 6/2016 |

OTHER PUBLICATIONS

Etter et al., "Aluminium carbide formation in interpenetrating graphite/aluminium composites", Materials Science and Engineering, Mar. 15, 2007, vol. 448, No. 1, pp. 1-6.

Hutsch et al., "Innovative Metal-Graphite Composites as Thermally Conducting Materials", PM2010 World Congress—PM Functional Materials—Heat Sinks, 2010, 8 pages.

International Search Report and Written Opinion; International Application No. PCT/US2014/065389; International Filing Date: Nov. 13, 2014; Date of Mailing: Mar. 18, 2015; 15 pages.

International Search Report and Written Opinion; International Application No. PCT/US2015/056196; International Filing Date: Oct. 19, 2015; Date of Mailing: Jan. 26, 2016; 13 pages.

Levin et al., "Solid Particle Erosion Resistance and High Strain Rate Deformation Behavior of Inconel-625 Alloy", Superalloys 718, 625, 706 and Various Derivatives, The Minerals, Metals & Materials Society, 1997, 10 pages.

Pohlmann et al., "Magnesium alloy-graphite composites with tailored heat conduction properties for hydrogen storage applications", International Journal of Hydrogen Energy, 35 (2010), pp. 12829-12836.

Tikhomirov et al., "The chemical vapor infiltration of exfoliated graphite to produce carbon/carbon composites", Carbon, 49 (2011), pp. 147-153.

Yang et al., "Effect of tungsten addition on thermal conductivity of graphite/copper composites", Composites Part B: Engineering, May 31, 2013, vol. 55, pp. 1-4.

Miyamoto et al., "Development of New Composites; Ceramic Bonded Carbon", Transactions of JWRI, vol. 38, No. 2, 2009, pp. 57-61.

Moghadam et al, "Functional Metal Matrix Composites: Self-lubricating, Self-healing, and Nanocomposites-An Outlook", The Minerals, Metals & Materials Society, Apr. 5, 2014, 10 pages.

International Search Report and Written Opinion of the International Search Authority dated Jan. 27, 2016 in related PCT Application No. PCT/US2015/056875, 11 pages.

Rashad et al. "Effect of of Graphene Nanoplatelets addition on mechanical properties of pure aluminum using a semi-powder method", Materials International, Apr. 20, 2014, vol. 24, pp. 101-108.

* cited by examiner

SELF-LUBRICATING FLEXIBLE CARBON COMPOSITE SEAL

BACKGROUND

Seals are widely used in subsurface exploration systems and $CO_2$ sequestration systems. Seals are employed both uphole and downhole. Dynamic seals provide a sealing interface between moving components and stationary components. Typically, seals are formed from plastics and elastomers. The use of plastics and elastomers both uphole and downhole presents various challenges. Plastics and elastomers are prone to wear caused by high temperature, high pressure and corrosive environments such as found in hydrocarbon recovery. Accordingly, seals formed from plastics and elastomers may experience a limited service life or are restricted from certain service environments.

Graphite is an allotrope of carbon and has a layered, planar structure. In each layer, the carbon atoms are arranged in hexagonal arrays or networks through covalent bonds. Different carbon layers however are held together only by weak van der Waals forces.

Graphite has been used in a variety of applications including electronics, atomic energy, hot metal processing, coatings, aerospace, and the like due to its excellent thermal and electrical conductivities, lightness, low friction, and high heat and corrosion resistances. However, conventional graphite is not elastic and has low strength, which may limit its further applications such as forming seals employed in a downhole environment. The industry would be receptive to improvements in seal technology including seals formed from a material exhibiting enhanced flexibility, chemical stability, corrosive resistance, as well as high temperature and high pressure resistance properties.

SUMMARY

A self-lubricating flexible carbon composite seal includes an annular body formed from a flexible carbon composite.

BRIEF DESCRIPTION OF THE DRAWINGS

Referring now to the drawings wherein like elements are numbered alike in the several Figures.

DETAILED DESCRIPTION

Figure 1:
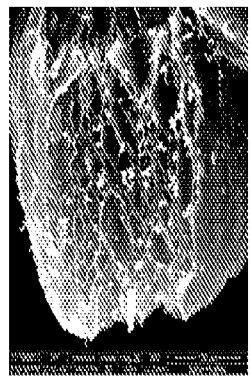
FIG. 1 is a scanning electron microscopic ("SEM") image of a composition containing expanded graphite and a micro- or nano-sized binder blended at room temperature and atmospheric pressure.

The inventors hereof have found that carbon composites formed from graphite and micro- or nano-sized binders at high temperatures have improved balanced properties as compared to graphite alone, a composition formed from the same graphite but different binders, or a mixture of the same graphite and the same binder blended at room temperature under atmospheric pressure or high pressures. The new carbon composites have excellent elasticity. In addition, the carbon composites have excellent mechanical strength, heat resistance, and chemical resistance at high temperatures. In a further advantageous feature, the composites keep various superior properties of the graphite such as heat conductivity, electrical conductivity, lubricity, and the alike.

Without wishing to be bound by theory, it is believed that the improvement in mechanical strength is provided by a binding phase disposed between carbon microstructures. There are either no forces or only weak Van der Waals forces exist between the carbon microstructures thus the graphite bulk materials have weak mechanical strength. At high temperatures, the micro- and nano-sized binder liquefies and is dispersed evenly among carbon microstructures. Upon cooling, the binder solidifies and forms a binding phase binding the carbon nanostructures together through mechanical interlocking.

Further without wishing to be bound by theory, for the composites having both improved mechanical strength and improved elasticity, it is believed that the carbon microstructures themselves are laminar structures having spaces between the stacked layers. The binder only selectively locks the microstructures at their boundaries without penetrating the microstructures. Thus the unbounded layers within the microstructures provide elasticity and the binding phase disposed between the carbon microstructures provides mechanical strength.

The carbon microstructures are microscopic structures of graphite formed after compressing graphite into highly condensed state. They comprise graphite basal planes stacked together along the compression direction. As used herein, carbon basal planes refer to substantially flat, parallel sheets or layers of carbon atoms, where each sheet or layer has a single atom thickness. The graphite basal planes are also referred to as carbon layers. The carbon microstructures are generally flat and thin. They can have different shapes and can also be referred to as micro-flakes, micro-discs and the like. In an embodiment, the carbon microstructures are substantially parallel to each other.

There are two types of voids in the carbon composites—voids or interstitial spaces between carbon microstructures and voids within each individual carbon microstructures. The interstitial spaces between the carbon microstructures have a size of about 0.1 to about 100 microns, specifically about 1 to about 20 microns whereas the voids within the carbon microstructures are much smaller and are generally between about 20 nanometers to about 1 micron, specifically about 200 nanometers to about 1 micron. The shape of the voids or interstitial spaces is not particularly limited. As used herein, the size of the voids or interstitial spaces refers to the largest dimension of the voids or interstitial spaces and can be determined by high resolution electron or atomic force microscope technology.

The interstitial spaces between the carbon microstructures are filled with a micro- or nano-sized binder. For example, a binder can occupy about 10% to about 90% of the interstitial spaces between the carbon microstructures. However, the binder does not penetrate the individual carbon microstructures and the voids within carbon microstructures are unfilled, i.e., not filled with any binder. Thus the carbon layers within the carbon microstructures are not locked together by a binder. Through this mechanism, the flexibility of the carbon composite, particularly, expanded carbon composite can be preserved.

The carbon microstructures have a thickness of about 1 to about 200 microns, about 1 to about 150 microns, about 1 to about 100 microns, about 1 to about 50 microns, or about 10 to about 20 microns. The diameter or largest dimension of the carbon microstructures is about 5 to about 500 microns or about 10 to about 500 microns. The aspect ratio of the carbon microstructures can be about 10 to about 500, about 20 to about 400, or about 25 to about 350. In an embodiment, the distance between the carbon layers in the carbon microstructures is about 0.3 nanometers to about 1 micron. The carbon microstructures can have a density of about 0.5 to about 3 g/cm$^3$, or about 0.1 to about 2 g/cm$^3$.

As used herein, graphite includes natural graphite, synthetic graphite, expandable graphite, expanded graphite, or a combination comprising at least one of the foregoing. Natural graphite is graphite formed by Nature. It can be classified as "flake" graphite, "vein" graphite, and "amorphous" graphite. Synthetic graphite is a manufactured product made from carbon materials. Pyrolytic graphite is one form of the synthetic graphite. Expandable graphite refers to graphite having intercallant materials inserted between layers of natural graphite or synthetic graphite. A wide variety of chemicals have been used to intercalate graphite materials. These include acids, oxidants, halides, or the like. Exemplary intercallant materials include sulfuric acid, nitric acid, chromic acid, boric acid, $SO_3$, or halides such as $FeCl_3$, $ZnCl_2$, and $SbCl_5$. Upon heating, the intercallant is converted from a liquid or solid state to a gas phase. Gas formation generates pressure which pushes adjacent carbon layers apart resulting in expanded graphite. The expanded graphite particles are vermiform in appearance, and are therefore commonly referred to as worms.

Advantageously, the carbon composites comprise expanded graphite microstructures. Compared with other forms of the graphite, expanded graphite has high flexibility and compression recovery, and larger anisotropy. The composites formed from expanded graphite and micro- or nano-sized binder under high pressure and high temperature conditions can thus have excellent elasticity in addition to desirable mechanical strength.

In the carbon composites, the carbon microstructures are held together by a binding phase. The binding phase comprises a binder which binds carbon microstructures by mechanical interlocking. Optionally, an interface layer is formed between the binder and the carbon microstructures. The interface layer can comprise chemical bonds, solid solutions, or a combination thereof. When present, the chemical bonds, solid solutions, or a combination thereof may strengthen the interlocking of the carbon microstructures. It is appreciated that the carbon microstructures may be held together by both mechanical interlocking and chemical bonding. For example the chemical bonding, solid solution, or a combination thereof may be formed between some carbon microstructures and the binder or for a particular carbon microstructure only between a portion of the carbon on the surface of the carbon microstructure and the binder. For the carbon microstructures or portions of the carbon microstructures that do not form a chemical bond, solid solution, or a combination thereof, the carbon microstructures can be bounded by mechanical interlocking. The thickness of the binding phase is about 0.1 to about 100 microns or about 1 to about 20 microns. The binding phase can form a continuous or discontinuous network that binds carbon microstructures together.

Exemplary binders include $SiO_2$, Si, B, $B_2O_3$, a metal, an alloy, or a combination comprising at least one of the foregoing. The metal can be aluminum, copper, titanium, nickel, tungsten, chromium, iron, manganese, zirconium, hafnium, vanadium, niobium, molybdenum, tin, bismuth, antimony, lead, cadmium, and selenium. The alloy includes the alloys of aluminum, copper, titanium, nickel, tungsten, chromium, iron, manganese, zirconium, hafnium, vanadium, niobium, molybdenum, tin, bismuth, antimony, lead, cadmium, and selenium. In an embodiment, the binder comprises copper, nickel, chromium, iron, titanium, an alloy of copper, an alloy of nickel, an alloy of chromium, an alloy of iron, an alloy of titanium, or a combination comprising at least one of the foregoing metal or metal alloy. Exemplary alloys include steel, nickel-chromium based alloys such as Inconel*, and nickel-copper based alloys such as Monel alloys. Nickel-chromium based alloys can contain about 40-75% of Ni, about 10-35% of Cr. The nickel-chromium based alloys can also contain about 1 to about 15% of iron. Small amounts of Mo, Nb, Co, Mn, Cu, Al, Ti, Si, C, S, P, B, or a combination comprising at least one of the foregoing can also be included in the nickel-chromium based alloys. Nickel-copper based alloys are primarily composed of nickel (up to about 67%) and copper. The nickel-copper based alloys can also contain small amounts of iron, manganese, carbon, and silicon. These materials can be in different shapes, such as particles, fibers, and wires. Combinations of the materials can be used.

The binder used to make the carbon composite is micro- or nano-sized. In an embodiment, the binder has an average particle size of about 0.05 to about 10 microns, specifically, about 0.5 to about 5 microns, more specifically about 0.1 to about 3 microns. Without wishing to be bound by theory, it is believed that when the binder has a size within these ranges, it disperses uniformly among the carbon microstructures.

When an interface layer is present, the binding phase comprises a binder layer comprising a binder and an interface layer bonding one of the at least two carbon microstructures to the binder layer. In an embodiment, the binding phase comprises a binder layer, a first interface layer bonding one of the carbon microstructures to the binder layer, and a second interface layer bonding the other of the microstructures to the binder layer. The first interface layer and the second interface layer can have the same or different compositions.

The interface layer comprises a C—metal bond, a C—B bond, a C—Si bond, a C—O—Si bond, a C—O-metal bond, a metal carbon solution, or a combination comprising at least one of the foregoing. The bonds are formed from the carbon on the surface of the carbon microstructures and the binder.

In an embodiment, the interface layer comprises carbides of the binder. The carbides include carbides of aluminum, titanium, nickel, tungsten, chromium, iron, manganese, zirconium, hafnium, vanadium, niobium, molybdenum, or a combination comprising at least one of the foregoing. These carbides are formed by reacting the corresponding metal or metal alloy binder with the carbon atoms of the carbon microstructures. The binding phase can also comprise SiC formed by reacting $SiO_2$ or Si with the carbon of carbon microstructures, or $B_4C$ formed by reacting B or $B_2O_3$ with the carbon of the carbon microstructures. When a combination of binder materials is used, the interface layer can comprise a combination of these carbides. The carbides can be salt-like carbides such as aluminum carbide, covalent carbides such as SiC, $B_4C$, interstitial carbides such as carbides of the group 4, 5, and 5 transition metals, or intermediate transition metal carbides, for example the carbides of Cr, Mn, Fe, Co, and Ni.

In another embodiment, the interface layer comprises a solid solution of carbon and the binder. Carbon have solubility in certain metal matrix or at certain temperature range, which helps both wetting and binding of metal phase onto carbon microstructures. Through heat-treatment, high solubility of carbon in metal can be maintained at low temperature. These metals include Co, Fe, La, Mn, Ni, or Cu. The binder layer can also comprises a combination of solid solutions and carbides.

The carbon composites comprise about 20 to about 95 wt. %, about 20 to about 80 wt. %, or about 50 to about 80 wt. % of carbon, based on the total weight of the composites. The binder is present in an amount of about 5 wt. % to about 75 wt. % or about 20 wt. % to about 50 wt. %, based on the total weight of the composites. In the carbon composites, the weight ratio of carbon relative to the binding is about 1:4 to about 20:1, or about 1:4 to about 4:1, or about 1:1 to about 4:1.

FIG. 1 is a SEM image of a composition containing expanded graphite and a micro- or nano-sized binder blended at room temperature and atmospheric pressure. As shown in FIG. 1, the binder (white area) is only deposited on the surface of some of the expanded graphite worms.

Figure 2:
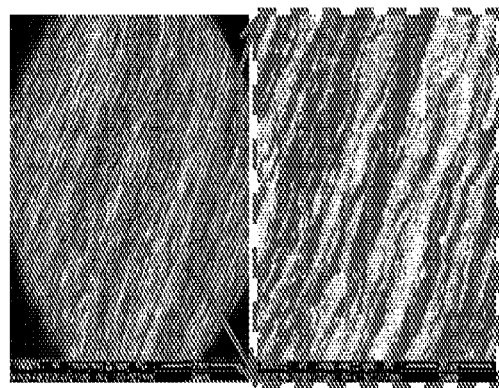
FIG. 2 is a SEM image of a carbon composite formed from expanded graphite and a micro- or nano-sized binder under high pressure and high temperature conditions according to one embodiment of the disclosure.

FIG. 2 is a SEM image of a carbon composite formed from expanded graphite and a micro- or nano-sized binder under high pressure and high temperature conditions. As shown in FIG. 2, a binding phase (light area) is evenly distributed between the expanded graphite microstructures (dark area).

Figure 3:
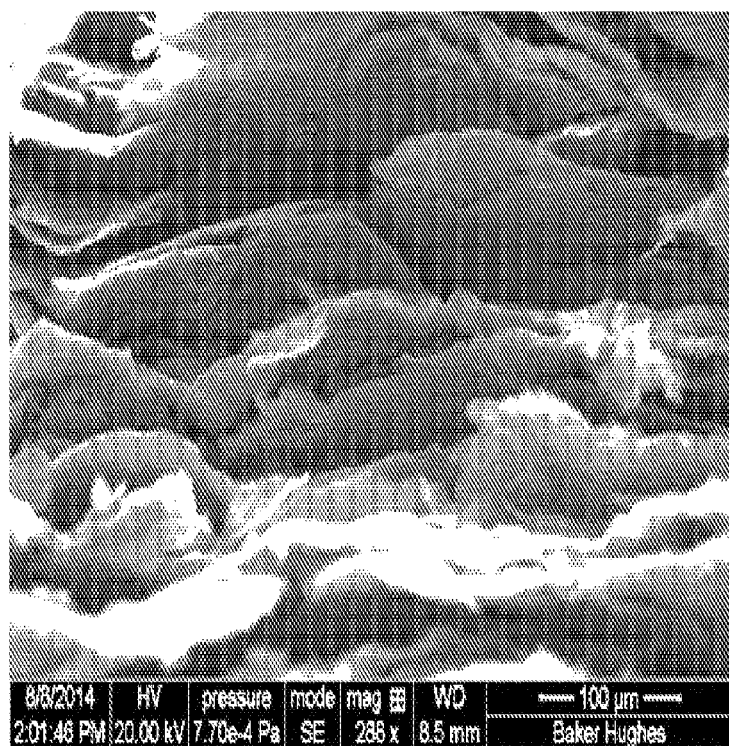
FIG. 3 is a SEM image of carbon microstructures according to another embodiment of the disclosure.
Figure 4:
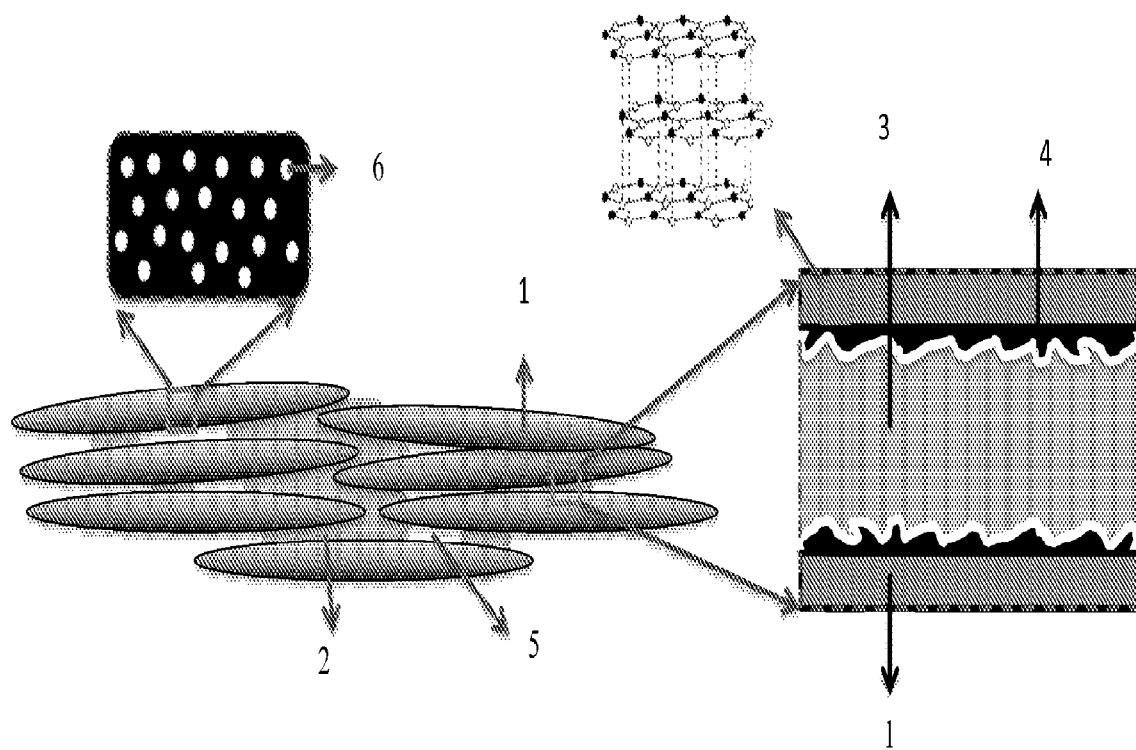
FIG. 4 is a schematic illustration of a carbon composite according to an embodiment of the disclosure.

A SEM image of carbon graphite microstructures are shown in FIG. 3. An embodiment of a carbon composite is illustrated in FIG. 4. As shown in FIG. 4, the composite comprises carbon microstructures 1 and binding phase 2 locking the carbon microstructures. The binding phase 2 comprises binder layer 3 and an optional interface layer 4 disposed between the binder layer and the carbon microstructures. The carbon composite contains interstitial space 5 among carbon microstructures 1. Within carbon microstructures, there are unfilled voids 6.

The carbon composites can optionally comprise a filler. Exemplary filler includes carbon fibers, carbon black, mica, clay, glass fiber, ceramic fibers, and ceramic hollow structures. Ceramic materials include SiC, $Si_3N_4$, $SiO_2$, BN, and the like. The filler can be present in an amount of about 0.5 to about 10 wt. % or about 1 to about 8%.

The composites can have any desired shape including a bar, block, sheet, tubular, cylindrical billet, toroid, powder, pellets, or other form that may be machined, formed or otherwise used to form useful articles of manufacture. The sizes or the dimension of these forms are not particularly limited. Illustratively, the sheet has a thickness of about 10 μm to about 10 cm and a width of about 10 mm to about 2 m. The powder comprises particles having an average size of about 10 μm to about 1 cm. The pellets comprise particles having an average size of about 1 cm to about 5 cm.

One way to form the carbon composites is to compress a combination comprising carbon and a micro- or nano-sized binder to provide a green compact by cold pressing; and to compressing and heating the green compact thereby forming the carbon composites. In another embodiment, the combination can be pressed at room temperature to form a compact, and then the compact is heated at atmospheric pressure to form the carbon composite. These processes can be referred to as two-step processes. Alternatively, a combination comprising carbon and a micro- or nano-sized binder can be compressed and heated directly to form the carbon composites. The process can be referred to as a one-step process.

In the combination, the carbon such as graphite is present in an amount of about 20 wt. % to about 95 wt. %, about 20 wt. % to about 80 wt. %, or about 50 wt. % to about 80 wt. %, based on the total weight of the combination. The binder is present in an amount of about 5 wt. % to about 75 wt. % or about 20 wt. % to about 50 wt. %, based on the total weight of the combination. The graphite in the combination can be in the form of chip, powder, platelet, flake, or the like. In an embodiment, the graphite is in the form of flakes having a diameter of about 50 microns to about 5,000 microns, preferably about 100 to about 300 microns. The graphite flakes can have a thickness of about 1 to about 5 microns. The density of the combination is about 0.01 to about 0.05 g/cm$^3$, about 0.01 to about 0.04 g/cm$^3$, about 0.01 to about 0.03 g/cm$^3$ or about 0.026 g/cm$^3$. The combination can be formed by blending the graphite and the micro- or nano-sized binder via any suitable methods known in the art. Examples of suitable methods include ball mixing, acoustic mixing, ribbon blending, vertical screw mixing, and V-blending.

Referring to the two-step process, cold pressing means that the combination comprising the graphite and the micro-sized or nano-sized binder is compressed at room temperature or at an elevated temperature as long as the binder does not significantly bond with the graphite microstructures. In an embodiment, greater than about 80 wt. %, greater than about 85 wt. %, greater than about 90 wt. %, greater than about 95 wt. %, or greater than about 99 wt. % of the microstructures are not bonded in the green compact. The pressure to form the green compact can be about 500 psi to about 10 ksi and the temperature can be about 20° C. to about 200° C. The reduction ratio at this stage, i.e., the volume of the green compact relative to the volume of the combination, is about 40% to about 80%. The density of the green compact is about 0.1 to about 5 g/cm$^3$, about 0.5 to about 3 g/cm$^3$, or about 0.5 to about 2 g/cm$^3$.

The green compact can be heated at a temperature of about 350° C. to about 1200° C., specifically about 800° C. to about 1200° C. to form the carbon composites. In an embodiment, the temperature is above the melting point of the binder, for example, about 20° C. to about 100° C. higher or about 20° C. to about 50° C. higher than the melting point of the binder. When the temperature is higher, the binder becomes less viscose and flows better, and less pressure may be required in order for the binder to be evenly distributed in the voids between the carbon microstructures. However, if the temperature is too high, it may have detrimental effects to the instrument.

The temperature can be applied according to a predetermined temperature schedule or ramp rate. The means of heating is not particularly limited. Exemplary heating methods include direct current (DC) heating, induction heating, microwave heating, and spark plasma sintering (SPS). In an embodiment, the heating is conducted via DC heating. For example, the combination comprising the graphite and the micro- or nano-sized binder can be charged with a current, which flows through the combination generating heat very quickly. Optionally, the heating can also be conducted under an inert atmosphere, for example, under argon or nitrogen. In an embodiment, the green compact is heated in the presence of air.

The heating can be conducted at a pressure of about 500 psi to about 30,000 psi or about 1000 psi to about 5000 psi. The pressure can be a superatmospheric pressure or a subatmospheric pressure. Without wishing to be bound by theory, it is believed that when a superatmospheric pressure is applied to the combination, the micro- or nano-sized binder is forced into the voids between carbon microstructures through infiltration. When a subatmospheric pressure is applied to the combination, the micro- or nano-sized binder can also be forced into the voids between the carbon microstructures by capillary forces.

In an embodiment, the desirable pressure to form the carbon composites is not applied all at once. After the green compact is loaded, a low pressure is initially applied to the composition at room temperature or at a low temperature to close the large pores in the composition. Otherwise, the melted binder may flow to the surface of the die. Once the temperature reaches the predetermined maximum temperature, the desirable pressure required to make the carbon composites can be applied. The temperature and the pressure can be held at the predetermined maximum temperature and the predetermined maximum temperature for 5 minutes to 120 minutes.

The reduction ratio at this stage, i.e. the volume of the carbon composite relative to the volume of the green compact, is about 10% to about 70% or about 20 to about 40%. The density of the carbon composite can be varied by controlling the degree of compression. The carbon composites have a density of about 0.5 to about 10 g/cm$^3$, about 1 to about 8 g/cm$^3$, about 1 to about 6 g/cm$^3$, about 2 to about 5 g/cm$^3$, about 3 to about 5 g/cm$^3$, or about 2 to about 4 g/cm$^3$.

Alternatively, also referring to a two-step process, the combination can be first pressed at room temperature and a pressure of about 500 psi to 30,000 psi to form a compact; the compact can be further heated at a temperature higher than the melting point of the binder to make the carbon composite. In an embodiment, the temperature can be about 20° C. to about 100° C. higher or about 20° C. to about 50° C. higher than the melting point of the binder. The heating can be conducted at atmospheric pressure.

In another embodiment, the carbon composite can be made from the combination of the graphite and the binder directly without making the green compact. The pressing and the heating can be carried out simultaneously. Suitable pressures and temperatures can be the same as discussed herein for the second step of the two-step process.

Hot pressing is a process that applies temperature and pressure simultaneously. It can be used in both the one-step and the two-step processes to make carbon composites.

The carbon composites can be made in a mold through a one-step or a two-step process. The obtained carbon composites can be further machined or shaped to form a bar, block, tubular, cylindrical billet, or toroid. Machining includes cutting, sawing, ablating, milling, facing, lathing, boring, and the like using, for example, a miller, saw, lathe, router, electric discharge machine, and the like. Alternatively, the carbon composite can be directly molded to the useful shape by choosing the molds having the desired shape.

Sheet materials such as web, paper, strip, tape, foil, mat or the like can also be made via hot rolling. In an embodiment, the carbon composite sheets made by hot rolling can be further heated to allow the binder to effectively bond the carbon microstructures together.

Carbon composite pellets can be made by extrusion. For example, a combination of the graphite and the micro- or nano-sized binder can be first loaded in a container. Then combination is pushed into an extruder through a piston. The extrusion temperature can be about 350° C. to about 1400°

C. or about 800° C. to about 1200° C. In an embodiment, the extrusion temperature is higher than the melting point of the binder, for example, about 20 to about 50° C. higher than the melting point of the binder. In an embodiment, wires are obtained from the extrusion, which can be cut to form pellets. In another embodiment, pellets are directly obtained from the extruder. Optionally, a post treatment process can be applied to the pellets. For example, the pellets can be heated in a furnace above the melting temperature of the binder so that the binder can bond the carbon microstructures together if the carbon microstructures have not been bonded or not adequately bonded during the extrusion.

Carbon composite powder can be made by milling carbon composites, for example a solid piece, through shearing forces (cutting forces). It is noted that the carbon composites should not be smashed. Otherwise, the voids within the carbon microstructures may be destroyed thus the carbon composites lose elasticity.

The carbon composites have a number of advantageous properties for use in a wide variety of applications. In an especially advantageous feature, by forming carbon composites, both the mechanical strength and the elastomeric properties are improved.

Figure 5:
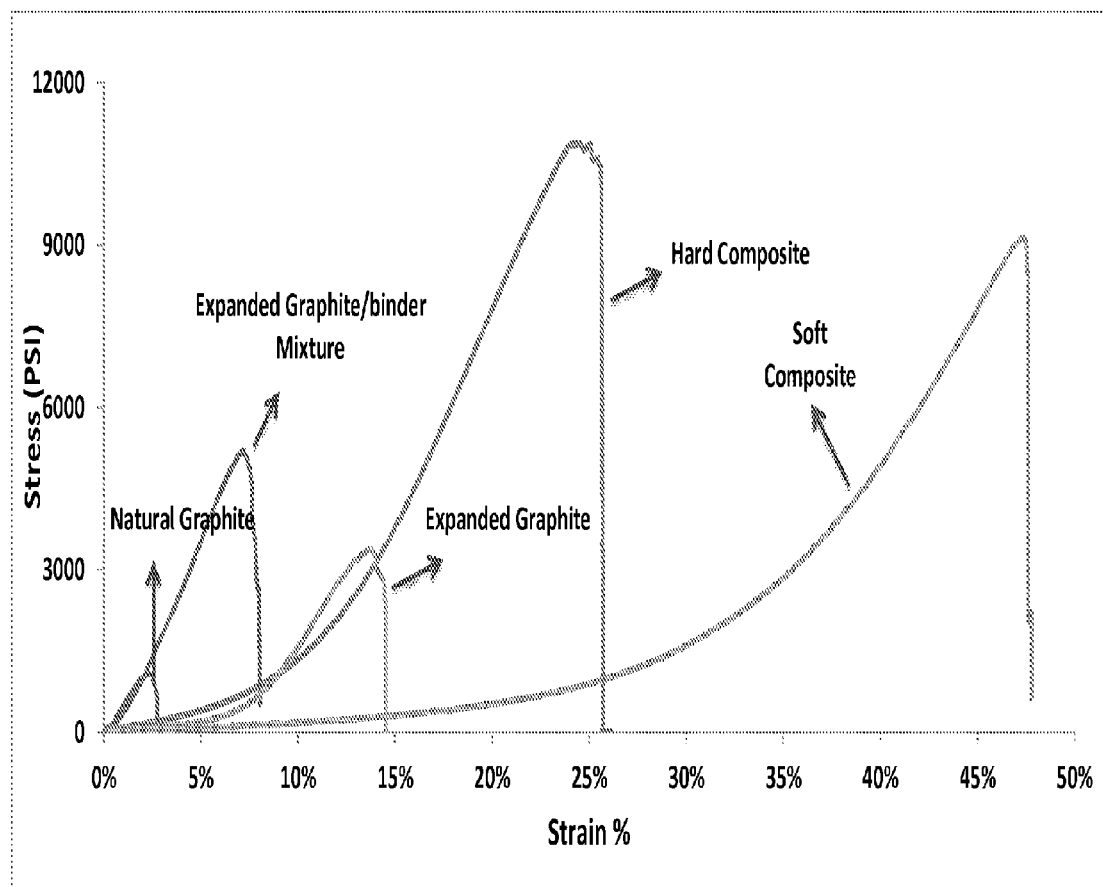
FIG. 5 shows stress-strain curves of (A) natural graphite; (B) expanded graphite; (C) a mixture of expanded graphite and a micro- or nano-sized binder, where the sample is compacted at room temperature and high pressure; (D) a carbon composite according to one embodiment of the disclosure compacted from a mixture of expanded graphite and a micro- or nano-sized binder at a high temperature and a low pressure (also referred to as "soft composite"); and (E) a carbon composite according to another embodiment of the disclosure formed from expanded graphite and a micro- and nano-sized binder under high pressure and high temperature conditions (also referred to as "hard composite")

To illustrate the improvement of elastic energy achieved by the carbon composites, the stress-strain curves for the following samples are shown in FIG. 5: (A) natural graphite, (B) expanded graphite, (C) a mixture of expanded graphite and a micro- or nano-sized binder formed at room temperature and atmospheric pressure, (D) a mixture of expanded graphite and a micro- or nano-sized binder formed by at a high temperature and atmospheric pressure; and (E) a carbon composite formed from expanded graphite and a micro- and nano-sized binder under high pressure and high temperature conditions. For the natural graphite, the sample was made by compressing natural graphite in a steel die at a high pressure. The expanded graphite sample was also made in a similar manner.

As shown in FIG. 5, the natural graphite has a very low elastic energy (area under the stress-strain curve) and is very brittle. The elastic energy of expanded graphite and the elastic energy of the mixture of expanded graphite and a micro- or nano-sized binder compacted at room temperature and high pressure is higher than that of the natural graphite. Conversely, both the hard and soft carbon composites of the disclosure exhibit significantly improved elasticity shown by the notable increase of the elastic energy as compared to the natural graphite alone, the expanded graphite alone, and the mixture of expanded graphite and binder compacted at room temperature and high pressure. In an embodiment, the carbon composites have an elastic elongation of greater than about 4%, greater than about 6%, or between about 4% and about 40%.

Figure 6:
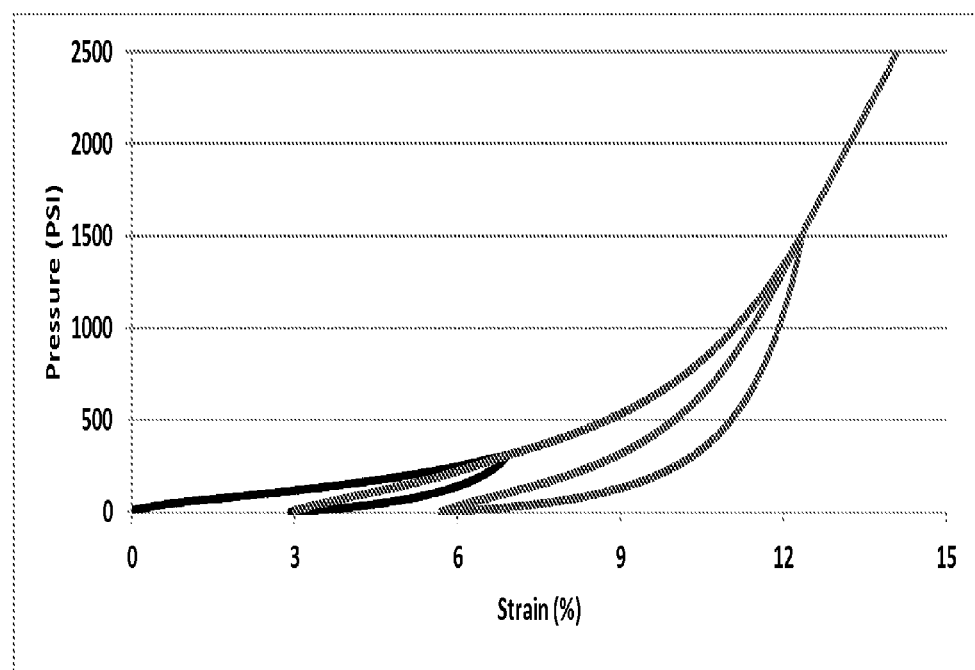
FIG. 6 shows loop test results of a carbon composite at different loadings.
Figure 7:
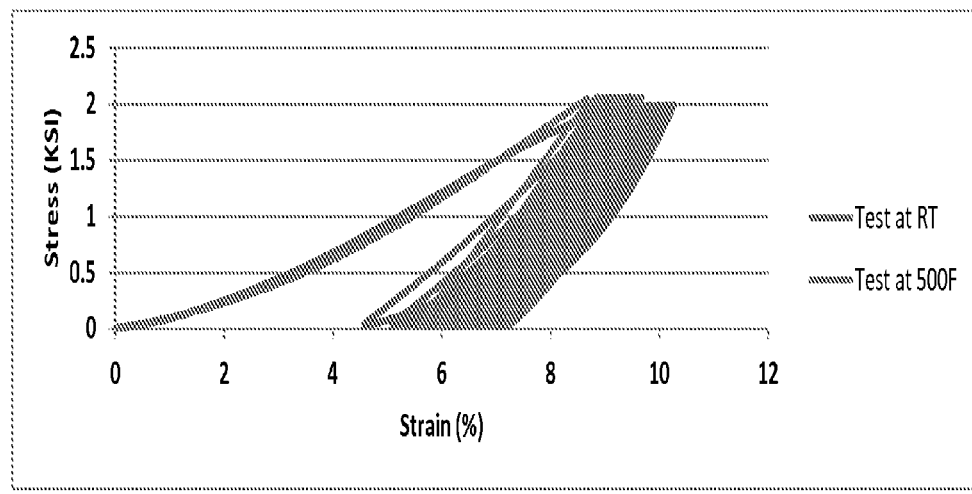
FIG. 7 shows hysteresis results of a carbon composite tested at room temperature and 500° F. respectively.

The elasticity of the carbon composites is further illustrated in FIGS. 6 and 7. FIG. 6 shows loop test results of a carbon composite at different loadings. FIG. 7 shows hysteresis results of a carbon composite tested at room temperature and 500° F. respectively. As shown in FIG. 7, the elasticity of the carbon composite is maintained at 500° F.

Figure 8:
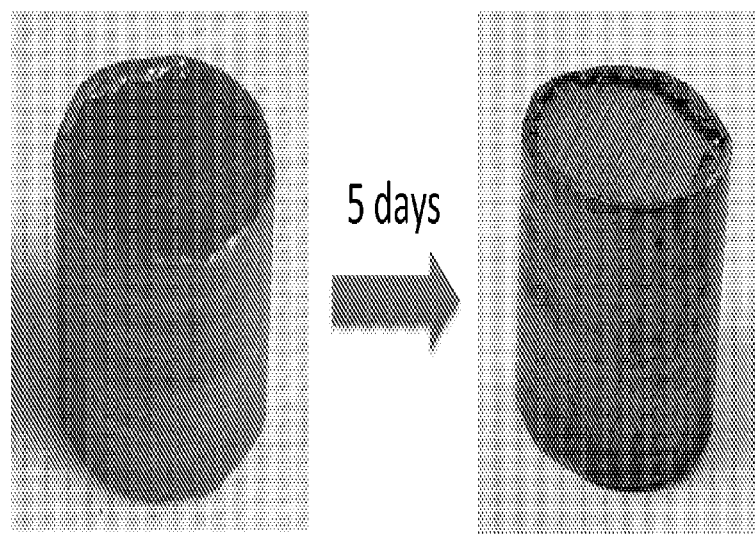
FIG. 8 compares a carbon composite before and after exposing to air at 500° C. for 25 hours.
Figure 9A:
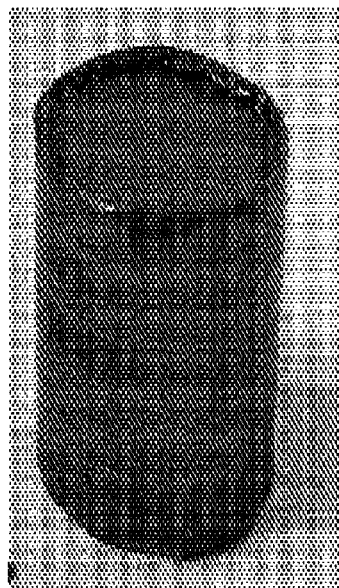
FIG. 9(A) is a photo of a carbon composite after a thermal shock.
Figure 9B:
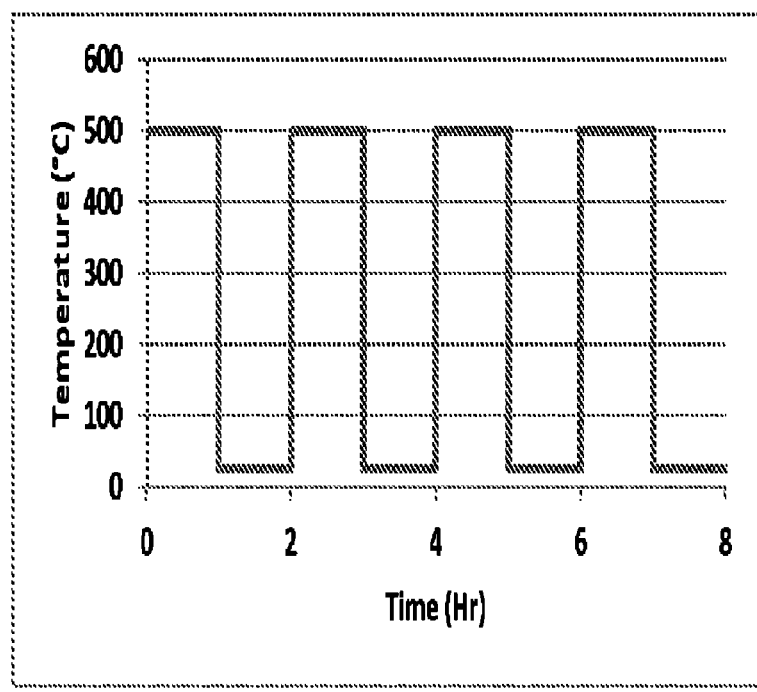
FIG. 9(B) illustrates the condition for the thermal shock.

In addition to mechanical strength and elasticity, the carbon composites can also have excellent thermal stability at high temperatures. FIG. 8 compares a carbon composite before and after exposing to air at 500° C. for 5 days. FIG. 9(A) is a photo of a carbon composite sample after a thermo shock for 8 hours. The condition for the thermal shock is shown in FIG. 9(B). As shown in FIGS. 8 and 9(A), there are no changes to the carbon composite sample after exposing to air at 500° C. for 25 hours or after the thermal shock. The carbon composites can have high thermal resistance with a range of operation temperatures from about −65° F. up to about 1200° F., specifically up to about 1100° F., and more specifically about 1000° F.

Figure 10:
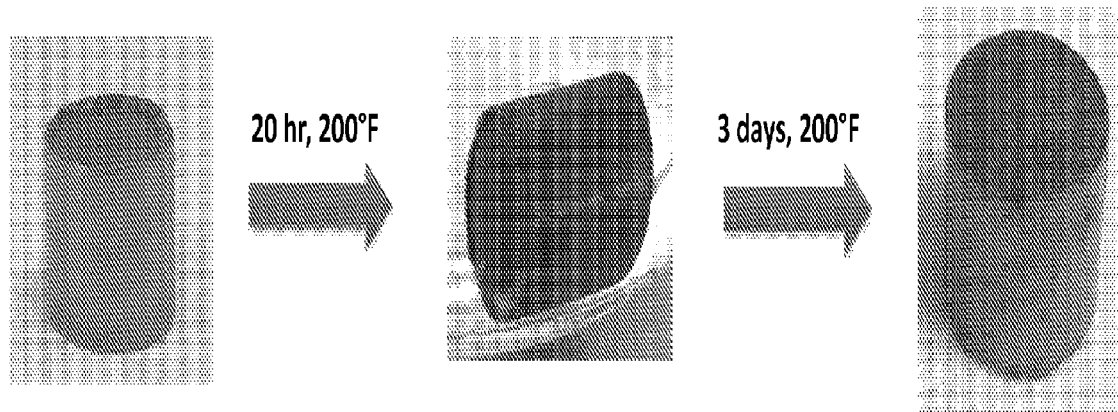
FIG. 10 compares a carbon composite sample (A) before and (B) after exposing to tap water for 20 hours at 200° F., or (C) after exposing to tap water for 3 days at 200° F.
Figure 11:
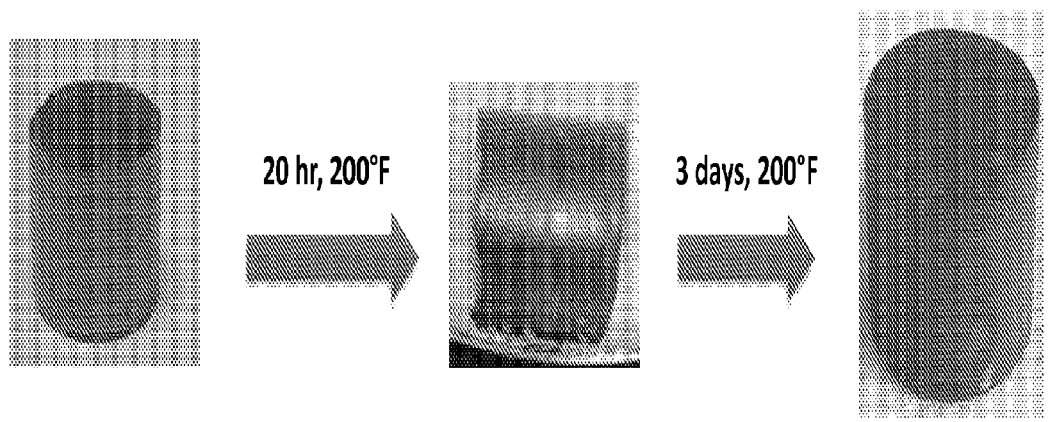
FIG. 11 compares a carbon composite sample (A) before and (B) after exposing to 15% HCl solution with inhibitor at 200° F. for 20 hours, or (C) after exposing to 15% HCl solution at 200° F. for 3 days.

The carbon composites can also have excellent chemical resistance at elevated temperatures. In an embodiment, the composite is chemically resistant to water, oil, brines, and acids with resistance rating from good to excellent. In an embodiment, the carbon composites can be used continuously at high temperatures and high pressures, for example, about 68° F. to about 1200° F., or about 68° F. to about 1000° F., or about 68° F. to about 750° F. under wet conditions, including basic and acidic conditions. Thus, the carbon composites resist swelling and degradation of properties when exposed to chemical agents (e.g., water, brine, hydrocarbons, acids such as HCl, solvents such as toluene, etc.), even at elevated temperatures of up to 200° F., and at elevated pressures (greater than atmospheric pressure) for prolonged periods. The chemical resistance of the carbon composite is illustrated in FIGS. 10 and 11. FIG. 10 compares a carbon composite sample before and after exposing to tap water for 20 hours at 200° F., or after exposing to tap water for 3 days at 200° F. As shown in FIG. 10, there are no changes to the sample. FIG. 11 compares a carbon composite sample before and after exposing to 15% HCl solution with inhibitor at 200° F. for 20 hours, or after exposing to 15% HCl solution at 200° F. for 3 days. Again, there are no changes to the carbon composite sample.

The carbon composites are medium hard to extra hard with harness from about 50 in SHORE A up to about 75 in SHORE D scale.

Figure 12:
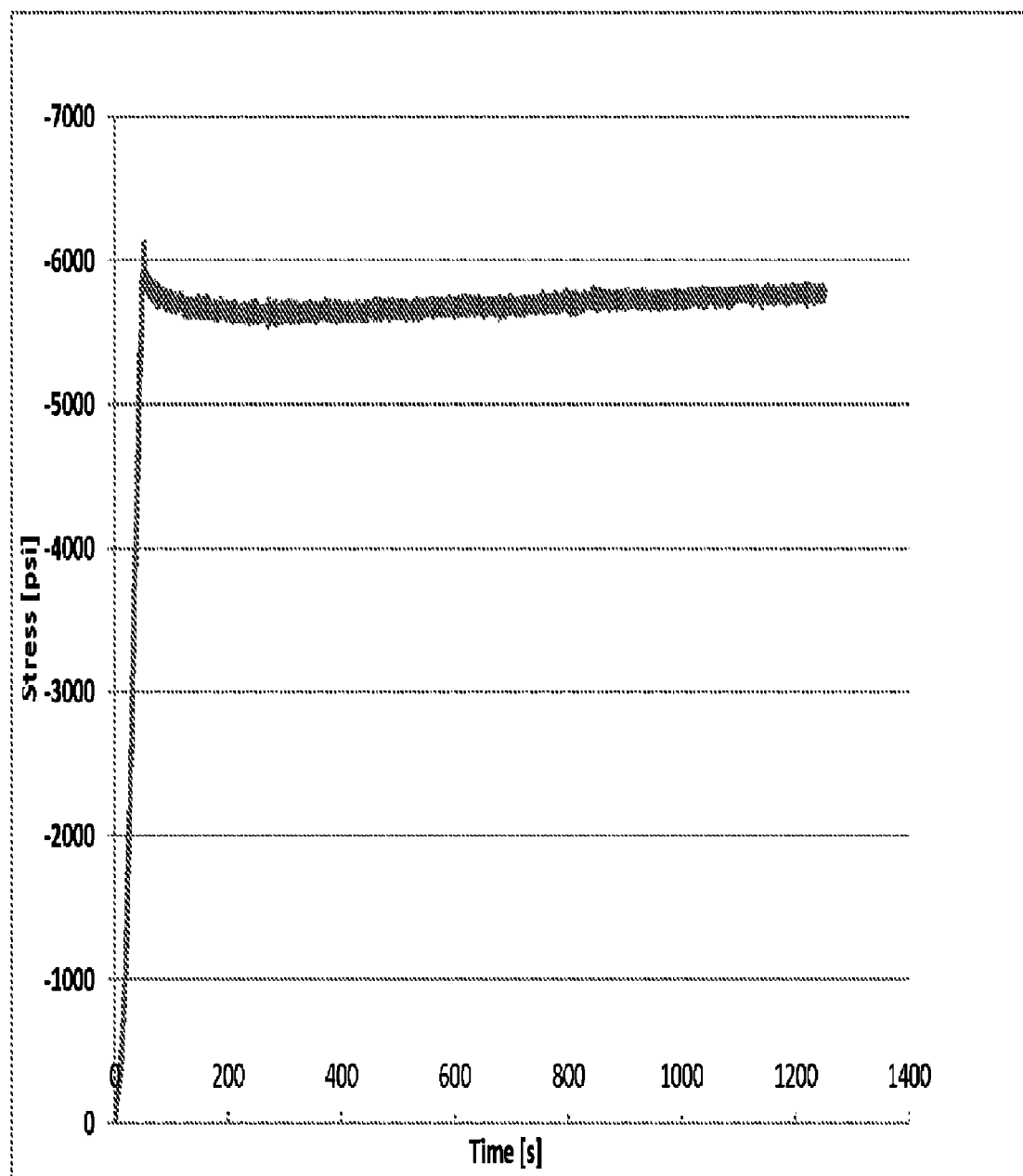
FIG. 12 shows the sealing force relaxation test results of a carbon composite at 600° F.

As a further advantageous feature, the carbon composites have stable sealing force at high temperatures. The stress decay of components under constant compressive strain is known as compression stress relaxation. A compression stress relaxation test also known as sealing force relaxation test measures the sealing force exerted by a seal or O-ring under compression between two plates. It provides definitive information for the prediction of the service life of materials by measuring the sealing force decay of a sample as a function of time, temperature and environment. FIG. 12 shows the sealing force relaxation test results of a carbon composite sample 600° F. As shown in FIG. 12, the sealing force of the carbon composite is stable at high temperatures. In an embodiment, the sealing force of a sample of the composite at 15% strain and 600° F. is maintained at about 5800 psi without relaxation for at least 20 minutes.

The carbon composites described above may be useful for preparing articles for a wide variety of applications including, but not limited to, electronics, hot metal processing, coatings, aerospace, automotive, oil and gas, and marine applications. Exemplary articles include seals, bearings, bearing seats, packers, valves, engines, reactors, cooling systems, and heat sinks. Thus, in an embodiment, an article comprises the carbon composites. The carbon composites may be used to form all or a portion of a downhole article in accordance with an aspect of an exemplary embodiment as will be discussed more fully below. Of course, it should be understood that the carbon composites may be employed in a wide range of applications and environments.

Figure 13:
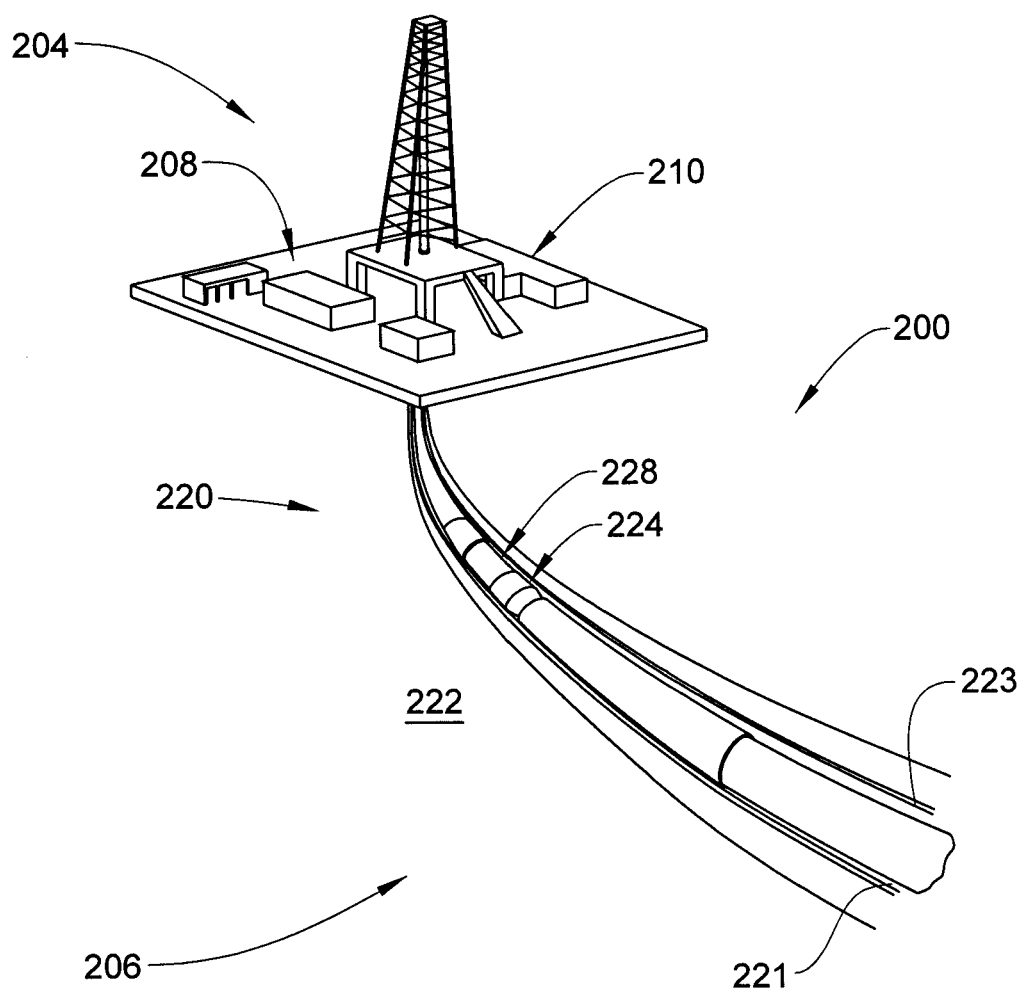
FIG. 13 depicts a subsurface exploration system including a tubular supporting a self-energizing flexible self-lubricating carbon composite seal, in accordance with an exemplary embodiment.

A subsurface exploration system, in accordance with an exemplary embodiment, is indicated generally at 200, in FIG. 13. Subsurface exploration system 200 includes an uphole system 204 operatively connected to a downhole system 206. Uphole system 204 may include pumps 208 that aid in completion and/or extraction processes as well as a fluid storage portion 210. Fluid storage portion 210 may contain a fluid that is introduced into downhole system 206. Downhole system 206 may include a downhole string 220 that is extended into a wellbore 221 formed in formation 222. Wellbore 221 may include a wellbore casing 223. Downhole string 220 may include a number of connected downhole tubulars 224. One of tubulars 224 may support a flexible carbon composite seal 228.

Figure 14:
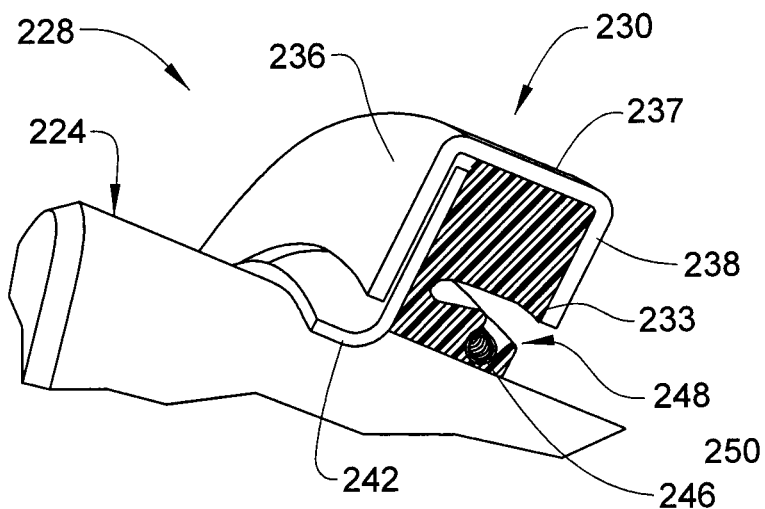
FIG. 14 depicts a partial cross-sectional view of the self-energizing flexible self-lubricating carbon composite seal of FIG. 13.

As shown in FIG. 14, flexible carbon composite seal 228 may include an annular support member 230 that surrounds, at least in part, an annular body 233. Annular body 233 is formed from a flexible carbon composite material such as described above. Annular support member 230 includes a first leg portion 236, a second leg portion 237, and a third leg portion 238 that retains annular body 233 about tubular 224. Of course, it should be understood, that annular support member 230 may retain annular body 233 about any number of structural types in order to prevent, or at least substantially limit, fluid leakage.

In the exemplary aspect shown, flexible carbon composite seal 228 includes a first lip member 242 and a second lip member 246. First lip member 242 may be formed from another material or could be formed from the same flexible carbon composite material used to form annular body 233. First and second lip members 242 and 246 engage with an outer surface (not separately labeled) of tubular 224 to limit passage of a fluid (not shown). Second lip member 246 may be externally biased toward the outer surface of tubular 224 by, for example, pressure of a downhole fluid. Alternatively, second lip member 246 may be self-energized toward the outer surface of tubular 224. Self-energization may take the form of a biasing member 248 shown in the form of a coil spring 250. Coil spring 250 may be nested within, or partially encapsulated by, second lip member 246. Coil spring 250 exerts a radially inwardly directed force onto second lip member 246 to maintain contact with the outer surface of tubular 224.

Figure 15:
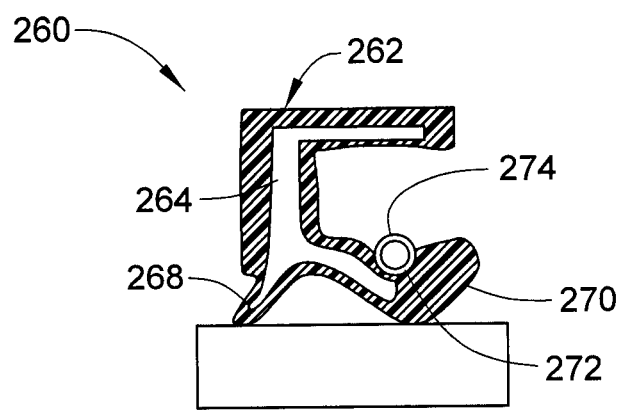
FIG. 15 depicts a partial cross-sectional view of a self-energizing flexible self-lubricating carbon composite seal, in accordance with another aspect of an exemplary embodiment.

FIG. 15 illustrates a flexible carbon composite seal 260 in accordance with another aspect of an exemplary embodiment. Flexible carbon composite seal 260 includes an annular body 262 that encapsulates a frame 264. Annular body 262 includes a first lip member 268 and a second lip member 270 that seal against an outer surface (not separately labeled) of tubular 224. Second lip member 270 may be externally energized, e.g., urged toward the outer surface of tubular 224, through an external force such as may be applied by a downhole or other fluid. Second lip member 270 may also be self-energized by, for example, a biasing member 272 shown in the form of a coil spring 274.

Figure 16:
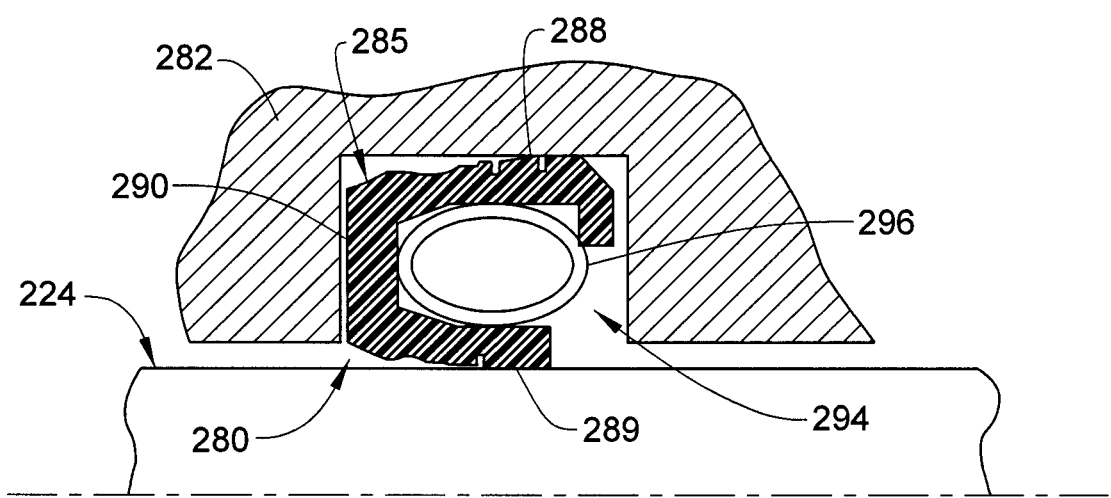
FIG. 16 depicts a cross-sectional view of a self-energized flexible self-lubricating carbon composite seal, in accordance with yet another aspect of an exemplary embodiment.

FIG. 16 illustrates a flexible carbon composite seal 280 in accordance with yet another aspect of an exemplary embodiment. Flexible carbon composite seal 280 is arranged in a support structure 282 that is positioned radially outwardly of tubular 224. Support structure 282 may take on a variety of forms including tubular members, tools, collars, and the like. Flexible carbon composite seal 280 includes an annular body 285 having a generally U-shaped cross-section. More specifically, annular body 285 includes a first seal portion 288 and a second seal portion 289 that are joined by a third seal portion 290. A biasing member 294, shown in the form of a coil spring 296, nests between first and second seal portions 288 and 290. Biasing member 294 is shown to urge second seal portion 289 into contact with an outer surface (not separately labeled) of tubular 224.

Figure 17:
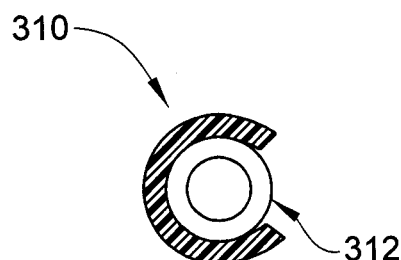
FIG. 17 depicts a cross-sectional view of a self-energized flexible self-lubricating carbon composite seal, in accordance with still yet another aspect of an exemplary embodiment.
Figure 18:
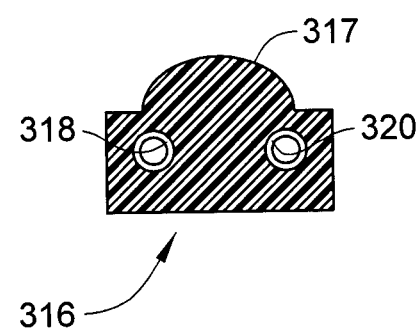
FIG. 18 depicts a cross-sectional view of a self-energized flexible self-lubricating carbon composite seal, in accordance with yet still another aspect of an exemplary embodiment.
Figure 19:
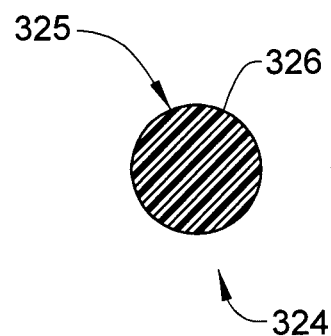
FIG. 19 depicts a cross-sectional view of a flexible self-lubricating carbon composite seal, in accordance with another aspect of an exemplary embodiment.
Figure 20:
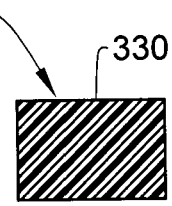
FIG. 20 depicts a cross-sectional view of a flexible self-lubricating carbon composite seal, in accordance with yet another aspect of an exemplary embodiment.
Figure 21:
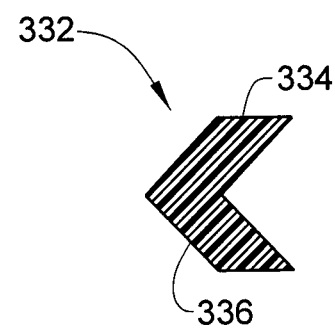
FIG. 21 depicts a cross-sectional view of a flexible self-lubricating carbon composite seal, in accordance with still another aspect of an exemplary embodiment.
Figure 22:
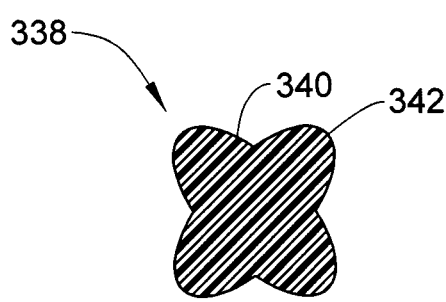
FIG. 22 depicts a cross-sectional view of a flexible self-lubricating carbon composite seal, in accordance with still yet another aspect of an exemplary embodiment.
Figure 23:
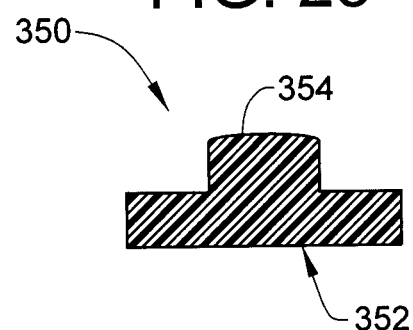
FIG. 23 depicts a cross-sectional view of a flexible self-lubricating carbon composite seal, in accordance with yet still another aspect of an exemplary embodiment.

FIG. 17 depicts a flexible carbon composite seal 310 having a generally C-shaped cross-section that surrounds, at least in part, a biasing member 312. FIG. 18 depicts a flexible carbon composite seal 316 including an annular body 317 that encapsulates first and second biasing members 318 and 320. FIG. 19 depicts a flexible carbon composite seal 324 in accordance with yet another aspect of an exemplary embodiment. Flexible carbon composite seal 324 includes an annular body 325 having a generally circular cross-section forming an O-ring seal 326. FIG. 20 depicts a flexible carbon composite seal 328 having an annular body 330 formed in a generally rectangular cross-section. FIG. 21 depicts a flexible carbon composite seal 332 having an annular body 334 formed in a generally V-shaped cross-section establishing a chevron or V-ring seal 336. FIG. 22 depicts a flexible carbon composite seal 338 having an annular body 340 including a generally X-shaped cross-section forming an X-ring seal 342. FIG. 23 depicts a flexible carbon composite seal 350 having an annular body 352 including a generally T-shaped cross-section forming a T-ring seal 354.

Figure 24:
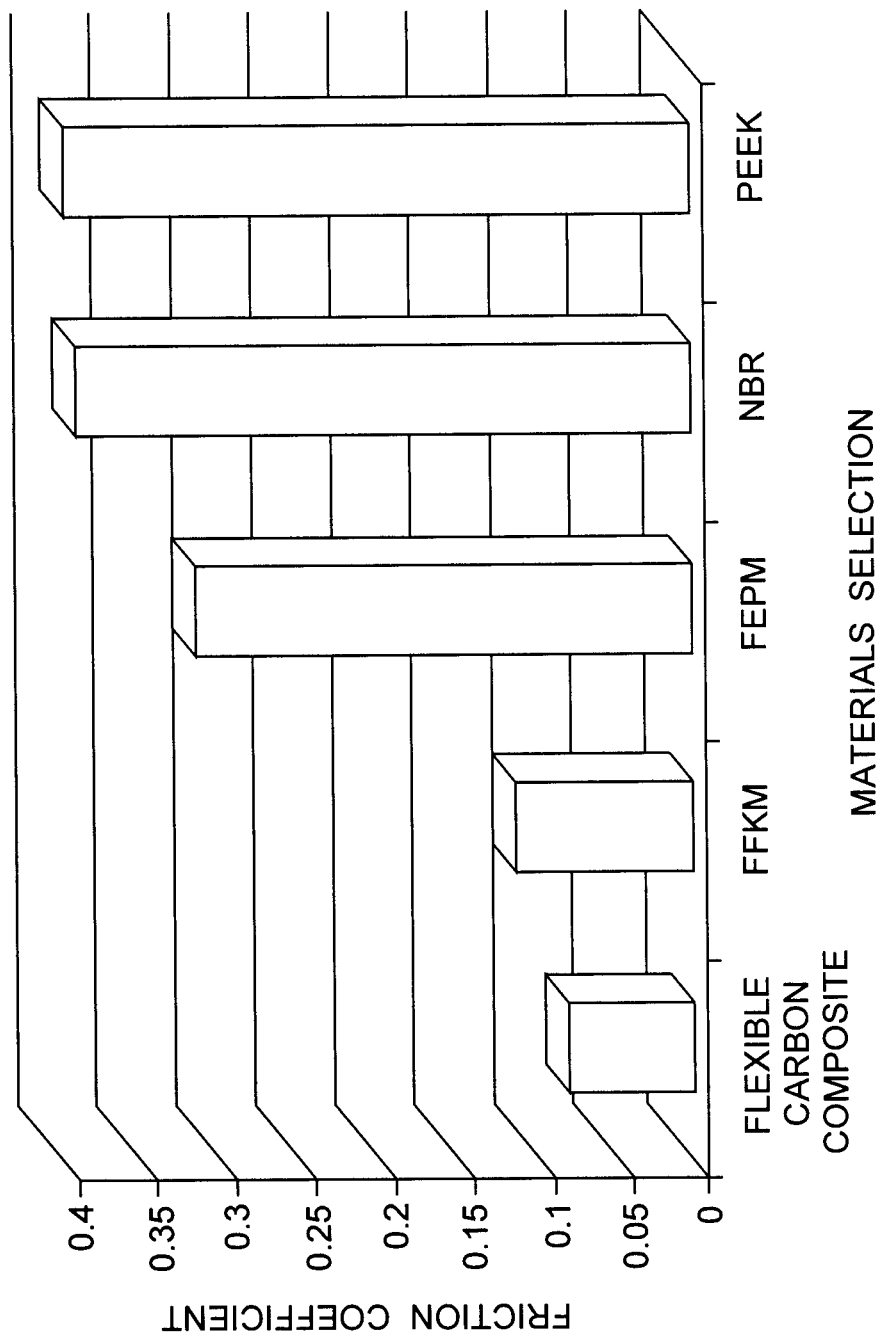
FIG. 24 depicts a graph comparing the flexible carbon composite, in accordance with an exemplary embodiment with other materials.

At this point it should be understood that the exemplary embodiments describe a flexible seal formed from a carbon composite material. The use of the carbon composite material not only provides self-lubricating characteristics due to a low coefficient of friction, but also enables the flexible seal to be employed in a wide range of operating environments. As shown in FIG. 24, the flexible carbon composite of the exemplary embodiment includes a lower coefficient of friction than that of perfluoro-elastomers (FFKM), tetraflouro-ethylene/propylene (FEPM), nitrile rubber (NBR) and polyether-ether ketone (PEEK). The self-lubricating/low friction characteristics of the flexible carbon composite material allows the flexible carbon seal to be employed on members that may rotate, e.g. include a rotation member, or members that reciprocate. The flexible seal resists galling, harsh chemicals, corrosion, oxidation and exposure to high temperatures. More specifically, the flexible seal may be employed in environments that reach upwards of 1200° F. (648.8° C.). Further, mechanical properties of the flexible seal may be tuned to application specific qualities by adjusting metal phase selection, graphite/metal ratio, heat treatment processing and the like. Also, it should be understood that in addition to hydrocarbon exploration and recovery applications, the flexible seal may also be employed in $CO_2$ sequestration, food and pharmaceutical applications as well as any other application that utilizes seals.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A self-lubricating flexible carbon composite seal comprising:
    an annular body formed from a flexible carbon composite, wherein the flexible carbon composite includes a carbon microstructure and binding phase including a binder which binds the carbon microstructures, the binder including one or more of $SiO_2$; Si, B, $B_2O_3$, a metal, and an alloy.

2. The self-lubricating flexible carbon composite seal according to claim 1, wherein the flexible carbon composite includes expanded graphite microstructures.

3. The self-lubricating flexible carbon composite seal according to claim 1, further comprising: an interface layer between the binder and the carbon microstructures.

4. The self-lubricating flexible carbon composite seal according to claim 3, wherein the interface layer comprises one or more of a chemical bond; or a solid solution.

5. The self-lubricating flexible carbon composite seal according to claim 1, wherein the metal comprises one or more of aluminum; copper; titanium; nickel; tungsten; chromium; iron; manganese; zirconium; hafnium; vanadium; niobium; molybdenum; tin; bismuth; antimony; lead; cadmium; or selenium.

6. The self-lubricating flexible carbon composite seal according to claim 1, wherein the alloy comprises one or more of an alloy of aluminum; an alloy of copper; an alloy of titanium; an alloy of nickel; an alloy of tungsten; an alloy of chromium; an alloy of iron; an alloy of manganese; an alloy of zirconium; an alloy of hafnium; an alloy of vanadium; an alloy of niobium; an alloy of molybdenum; an alloy of tin; an alloy of bismuth; an alloy of antimony; an alloy of lead, an alloy of cadmium; or an alloy of selenium.

7. The self-lubricating flexible carbon composite seal according to claim 1, wherein the binder comprises one or more of copper; nickel; chromium; iron; titanium; an alloy of copper; an alloy of nickel; an alloy of chromium; an alloy of iron; or an alloy of titanium.

8. The self-lubricating flexible carbon composite seal according to claim 1, further comprising: a frame, the annular body encapsulating a portion of the frame.

9. The self-lubricating flexible carbon composite seal according to claim 8, further comprising: a biasing member arranged adjacent to the frame.

10. The self-lubricating flexible carbon composite seal according to claim 9, wherein the annular body encapsulates the biasing member.

11. The self-lubricating flexible carbon composite seal according to claim 1, further comprising: at least one biasing member, the annular body extending about at least a portion of the at least one biasing member.

12. The self-lubricating flexible carbon composite seal according to claim 11, wherein the at least one biasing member includes first and second biasing members encased by the annular body.

13. The self-lubricating flexible carbon composite seal according to claim 1, wherein the annular body defines one or more of an O-ring seal; a rectangular seal; a V-ring seal; a T-ring seal; or an X-ring seal.

14. The self-lubricating flexible carbon composite seal according to claim 1, wherein the annular body defines a C-ring seal extending about a coil spring.

15. The self-lubricating flexible carbon composite seal according to claim 1, wherein the annular body is configured and disposed to seal against a rotating member.

16. The self-lubricating flexible carbon composite seal according to claim 1, wherein the annular body is configured and disposed to seal against a reciprocating member.

17. The self-lubricating flexible carbon composite seal according to claim 1, wherein the annular body has a coefficient of friction of about 0.05.

18. The self-lubricating flexible carbon composite seal according to claim 1, wherein the annular body is configured and disposed to inhibit the passage of fluid.

19. The self-lubricating flexible carbon composite seal according to claim 1, wherein the binding phase binds the carbon microstructures by mechanical interlocking.

* * * * *